United States Patent
Lewis (10) Patent No.: US 7,076,959 B2
(45) Date of Patent: Jul. 18, 2006

(54) ENHANCED MAGNETOCALORIC EFFECT MATERIAL

(75) Inventor: Laura J. H. Lewis, Calverton, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 0 days.

(21) Appl. No.: 11/072,125

(22) Filed: Mar. 7, 2005

(65) Prior Publication Data

US 2005/0172643 A1   Aug. 11, 2005

Related U.S. Application Data

(63) Continuation-in-part of application No. 10/608,733, filed on Jun. 30, 2003, now abandoned.

(51) Int. Cl.
*F25B 21/00* (2006.01)
*C09K 5/00* (2006.01)
*B22F 3/00* (2006.01)
*B22F 9/00* (2006.01)

(52) U.S. Cl. ......................... 62/3.1; 252/67; 252/62.55; 75/246

(58) Field of Classification Search .................. 62/3.1; 252/67, 62.55; 75/246, 249
See application file for complete search history.

(56) References Cited

U.S. PATENT DOCUMENTS

| | | | | |
|---|---|---|---|---|
| 4,849,017 A * | 7/1989 | Sahashi et al. | ............... | 75/245 |
| 4,985,072 A * | 1/1991 | Sahashi et al. | ............... | 75/246 |
| 5,381,664 A * | 1/1995 | Bennett et al. | ............... | 62/3.1 |
| 5,593,517 A * | 1/1997 | Saito et al. | ................ | 148/301 |
| 5,743,095 A * | 4/1998 | Gschneidner et al. | ........ | 62/3.1 |
| 5,767,673 A * | 6/1998 | Batlogg et al. | ............. | 324/252 |
| 5,897,963 A * | 4/1999 | Seuntjens | .................. | 428/607 |
| 6,022,486 A * | 2/2000 | Tokai et al. | .................. | 252/67 |
| 2002/0040583 A1* | 4/2002 | Barclay et al. | ............... | 62/3.1 |

* cited by examiner

*Primary Examiner*—William C. Doerrler
(74) *Attorney, Agent, or Firm*—Margaret C. Bogosian (57) ABSTRACT

A magnetocaloric effect heterostructure having a core layer of a magnetostructural material with a giant magnetocaloric effect having a magnetic transition temperature equal to or greater than 150 K, and a constricting material layer coated on at least one surface of the magnetocaloric material core layer. The constricting material layer may enhance the magnetocaloric effect by restriction of volume changes of the core layer during application of a magnetic field to the heterostructure. A magnetocaloric effect heterostructure powder comprising a plurality of core particles of a magnetostructural material with a giant magnetocaloric effect having a magnetic transition temperature equal to or greater than 150 K, wherein each of the core particles is encapsulated within a coating of a constricting material is also disclosed. A method for enhancing the magnetocaloric effect within a giant magnetocaloric material including the step of coating a surface of the magnetocaloric material with a constricting material is disclosed.

37 Claims, 5 Drawing Sheets

ENHANCED MAGNETOCALORIC EFFECT MATERIAL

The present application is a continuation-in-part of U.S. patent application Ser. No. 10/608,733, filed on Jun. 30, 2003, now abandoned.

This invention was made with Government support under contract number DE-AC02-98CH10886, awarded by the U.S. Department of Energy. The Government has certain rights in the invention.

BACKGROUND OF THE INVENTION

The present invention relates generally to materials that exhibit thermodynamically first-order magnetic transitions (i.e., the magnetic state change is accompanied by changes in the volume and/or crystal structure of the material) and, more particularly, to a method of enhancing the magnetocaloric effect (MCE) in such magnetostructural materials.

Figure 1:
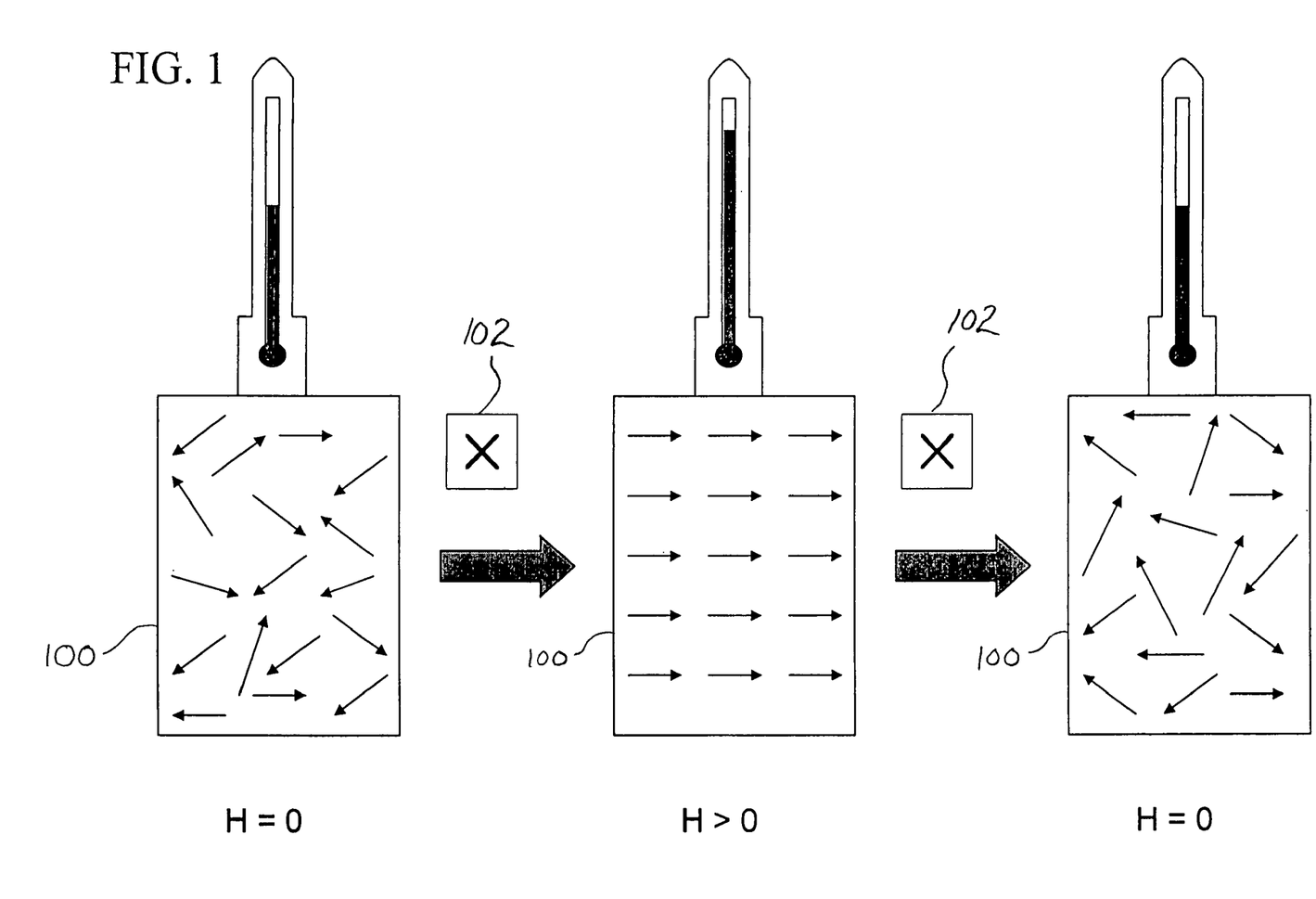
FIG. 1 is a schematic diagram illustrating the magnetocaloric effect (MCE) in materials.

The magnetocaloric effect (MCE) describes the adiabatic conversion of a magnetically-induced entropy change to the evolution or absorption of heat, with a corresponding rise or decrease in temperature. FIG. 1 provides a schematic illustration of the magnetocaloric effect in a material 100. It is usual to quantify the MCE by the entropy change achieved by a change of magnetic field 102. The entropy change is determined from dc magnetic measurement by using the Maxwell relation:

$$\left(\frac{\partial S(T, H)}{\partial H}\right)_T = \left(\frac{\partial M(T, H)}{\partial T}\right)_H \quad [1]$$

which can then yield a magnetic entropy change $\Delta S_M$:

$$\Delta S_M(T, \Delta H) = \int_{H_1}^{H_2} \left(\frac{\partial M(T, H)}{\partial T}\right)_H dH. \quad [2]$$

In the previous expressions [1] and [2], T is the absolute temperature and H is the magnetic field. Typical (adiabatic) magnetocaloric temperature changes under an applied field change of 7 T range from $\Delta T_{ad} \approx 2.5$ K at T=10 K for Nd to $\Delta T_{ad} \approx 12$ K at T~180 K for Dy.

Systems employing the magnetocaloric effect are important for energy-efficient, low-$CO_2$ emission refrigeration, air conditioning for vehicles and buildings, as well as for responsive temperature/heat sensor applications. Materials with a large magnetocaloric effect may also be utilized as heat pumps and, compared with the conventional vapor-cycle refrigerator, the magnetic refrigerator is environmentally benign and has a number of advantages which include high efficiency, low mechanical vibration and compact size.

Briefly, an active magnetic regenerator (AMR) refrigerator employs a porous or particulate bed of a magnetic refrigerant working material that acts as both the coolant that produces refrigeration and the regenerator for the heat transfer fluid. As the magnetic working material is subjected to the application of a magnetic field, the particles of the material warm in an adiabatic manner from the MCE and absorb heat from the environment. As fluid flows through the particle bed from the cold end to the hot end, the working material warms the fluid via heat transfer. The heat from the fluid is removed at the hot heat sink in the heat exchanger. After the fluid flow is stopped, the magnetic field is removed which then causes the magnetic working material to cool. The hot fluid is forced back to the now-cool porous bed of material where it is cooled by the bed. Remnant heat is removed from the fluid by the cold sink in the cold heat exchanger.

The potential applications of magnetic refrigeration are wide-ranging; with properly optimized performance, it is expected that they will be employed in building climate control, frozen food processing plants and supermarket chillers. Utilization of these materials can be envisioned in automotive and aircraft climate control, with an especially promising application of automotive climate control for zero-emission electric vehicles.

Magnetic refrigeration technology can accomplish those objectives in an environmentally-friendly manner, without the use of ozone-depleting chemicals such as CFCs (halogenated chlorofluorocarbons), HCFCs (hydrochlorofluorocarbons), HFCs (hydrofluorocarbons), PFCs (fluorocarbons) and $SF_6$ (sulfur hexafluoride), other hazardous chemicals ($NH_3$) and without the production of additional greenhouse gases. The energy efficiency resulting from use of technologies employing magnetic refrigeration is anticipated to reduce the amount of energy consumed as well as reduce $CO_2$ emissions. Thus, two significant benefits of magnetic refrigeration technology are the replacing CFC's (which will reduce the potential for global warming) and designing climate control in large buildings and electric vehicles. The latter technology will allow a greater fraction of the available automobile power to be used for transportation rather than be exhausted for climate control.

With those advantages in mind, significant challenges to the technological development of these systems exist. Probably the most daunting technological hurdle remaining is the development of a cost-effective MCE material requiring practical magnetic fields and size considerations.

All magnetic materials, to a greater or lesser degree, exhibit a magnetocaloric effect. However, some materials, by virtue of a unique electronic structure or physical nanostructure, may display a significantly enhanced MCE which may potentially be harnessed for technological application. In contrast to the MCE found in paramagnetic (PM) materials, the large MCE exhibited by ferromagnetic (FM) materials near their magnetic phase transition temperature (the Curie temperature $T_C$) renders them suitable as working materials for magnetic cooling at temperatures T>~20 K, and up to the target temperatures appropriate for commercial, industrial and home refrigeration application and heat pump devices, 200 K–400 K (approximately −70° C.~130° C.).

Further enhancements of the ferromagnetic MCE are possible if the magnetic transition at $T_C$ is accompanied by a crystallographic lattice distortion, as is often found in strongly-correlated electron systems. This lattice distortion may be either a contraction or an expansion of the atomic lattice, and may or may not include a change of symmetry. Such coupled magnetostructural changes are often referred to as first-order magnetic phase changes. The enhancement of the MCE in such materials arises because of the overall greater entropy change that occurs with a combined crystallographic and magnetic phase change. While materials such as amorphous and nanocrystalline alloys, intermetallic compounds, perovskite-type oxides and, recently, pnictides and carbides, have all been topics of vigorous study over the past 5 years by virtue of their interesting MCE properties, to date the most promising MCE material is the intermetallic compound series based on the composition $Gd_5(Si_xGe_{1-x})_4$, where $0 \leq x \leq 0.5$.

The magnetocaloric effect produced by this family of compounds, also referred to as GdSiGe, has been christened as "giant" because of its extremely large magnitude. In particular, the MCE of the GdSiGe alloys is reversible and exceeds that of any other known magnetic material by a factor of two. Another noteworthy characteristic of the GdSiGe family is that the Curie temperature, and hence the MCE, may be tuned with compositional variation. This feature allows the working temperature of the magnetic refrigerator to vary from 30 K to 276 K, and possibly higher, by adjusting the Si:Ge ratio. Moreover, the GdSiGe series of compositions is "metamagnetic", which means that the magnetic transition from ferromagnetic to paramagnetic behavior at the Curie point can be induced by applied field and pressure as well as by increased temperature.

However, magnetocaloric materials made from gadolinium (Gd) and in particular its alloys are generally very expensive and require very large and, therefore, impractical magnetic fields on the order of 2–10 T to yield a large magnetocaloric effect. For example, the typical AMR refrigerator described above, utilizing approx. 3 kg of Gd spheres, operates near room temperature in applied magnetic fields between 1.5 T and 5 T. This design provides a temperature span of 38 degrees for a field change of 5 T, and it generates up to 600 W of cooling power in a 5 T field with an efficiency that approaches 60% at 5 T. While these may be impressive figures, a magnetic field of 5 T can only be generated with a superconducting magnet that needs liquid helium to operate. Thus, the main drawback impeding the successful exploitation of the GdSiGe alloys is that the magnetic field magnitude required to obtain the spectacular magnetocaloric effect is simply too high for wide-spread commercial, home and transportation sector use.

U.S. Pat. No. 5,743,095 to Gschneidner, et al. discloses an improved $Gd_5(Si_{1-x}Ge_x)_4$ magnetic refrigerant that provides a high magnetocaloric effect and a high regenerator efficiency parameter. It is stated that the inclusion of a magnetically-soft alloying element, such as Mn, Fe, Co or Ni within the $Gd_5(Si_{1-x}Ge_x)_4$ compound optimizes the magnetocaloric effect properties of the refrigerant. However, the magnetic field necessary to influence the magnetocaloric effect of this improved compound is still obtainable only with liquid-He-cooled superconducting magnets, which are not practical additions in typical applications.

U.S. Pat. No. 4,985,072 to Sahashi, et al. discloses a composite material consisting of finely crystalline powders of magnetic rare-earth-based (Laves phase) intermetallic compounds that may be directly compacted in a metallic binder matrix or which may first be layered with Ni, Co or Fe and then compacted in a densely solid metallic binder matrix. There are two main motivations behind Sahashi et al.'s invention: i) to provide a plurality of compounds with different magnetic transition temperatures within a single compact and ii) to improve thermal conductivity of the magnetic substances. Sahashi et al. Claim their magnetic composite can provide a high magnetocaloric effect over a wide range of temperatures, and demonstrate magnetic transition temperature ranges of approximately 10 K to 70 K, depending upon the specific embodiment. The materials of the Sahashi teachings would, therefore, be unsuitable for use of a liquid as the heat transfer medium and thus a solid metallic matrix is necessary.

Focusing solely on magnetoresistive materials, U.S. Pat. No. 5,767,673 to Batlogg et al. describes an improved magnetoresistance obtained in a thin single crystal perovskite $La_{2/3}Ca_{1/3}MnO_3$ at extremely low fields when two magnetically-soft ferromagnetic $(Mn,Zn)Fe_2O_4$ bars were used in close proximity to the perovskite manganite. It is stated that the magnetically-soft material can be thinly layered on the magnetoresistive core or it can be mixed with a magnetoresistive material to produce the improved magnetoresistive element. In each case, it is disclosed that the magnetically-soft material placed in close proximity to the magnetoresistive core serves to increase the magnetic field experienced by the magnetoresistive core resulting in an increased magnetoresistive effect at low applied magnetic fields.

While such advances have been made in the field of magnetoresistance, it is clear that innovative material design and engineering is needed to lower the applied magnetic field necessary to realize the optimum MCE in magnetocaloric materials. In particular, there is a great motivation to bridge the gap between giant magnetocaloric materials and the state-of-the-art AMR permanent magnet refrigerator design.

SUMMARY OF THE INVENTION

The present invention involves the application of a conformal thin layer of a constricting material to a magnetostructural material having a giant MCE to effectively amplify the magnetic field applied to and experienced by the magnetostructural material and thereby lower the critical field necessary to realize a large MCE without adversely affecting the functionality of the material.

Thus, the present invention is a magnetocaloric effect heterostructure having a core layer of a magnetostructural material with a giant magnetocaloric effect, and a constricting material layer coated on at least one surface of the magnetostructural material layer. The constricting material layer may serve to restrict expansion or contraction of the core layer during application of a magnetic field to the heterostructure, and thereby amplify the magnetic field experienced by the magnetostructural (magnetocaloric) core.

Preferably, the core layer of magnetostructural material is any giant magnetocaloric material having a magnetic phase transition temperature that is equal to or greater than 150 K, such as the $Gd_5(Si_{1-x}Ge_x)_4$ family of compounds, and the constricting material layer may be a low-coercivity, high-magnetization material such as iron (Fe), cobalt (Co), nickel (Ni) and magnetic oxides or it may be a non-ferromagnetic material such as Si, Al, Cu, Sn, their alloys and organic polymers. Additionally, the constricting material layer is preferably coated on opposite surfaces of the core layer and, more preferably, substantially encapsulates said core layer.

In a preferred embodiment, the present invention is in the form of a magnetocaloric effect heterostructure powder or highly porous compact including a plurality of core particles of a magnetostructural material having a giant magnetocaloric effect. It is necessary to design the MCE heterostructure in such a way as to allow the flow of the heat transfer fluid. Each of the core particles is encapsulated within a coating of constricting material that effectively serves to amplify the magnetic field experienced by magnetostructural material possibly through mechanical restriction of expansion and contraction of the core particles during application of a magnetic field.

Again, the magnetostructural material of the core particles is any giant magnetocaloric material having a magnetic phase transition temperature that is equal to or greater than 150 K, e.g., the $Gd_5(Si_{1-x}Ge_x)_4$ family of compounds, and the constricting coating is a low-coercivity, high-magnetization material such as iron, cobalt, nickel and magnetic oxides or is a non-ferromagnetic material such as Si, Al, Cu, Sn, their alloys and organic polymers. Also, the core particles are preferably substantially spherical and have a diameter of about 30 µm, whereas the coating has a thickness between 50 nm and 200 nm.

The present invention further involves a method for enhancing the magnetocaloric effect within a giant magnetocaloric material including the processing step of coating a surface of the magnetocaloric material with a constricting material. The constricting material may restrict volume changes (expansion and contraction) of the magnetocaloric material during application of a magnetic field thereto, thereby enhancing the magnetocaloric effect.

As a result of the present invention, it is possible to significantly lower the applied magnetic fields necessary to obtain a large heating or cooling effect in giant magnetocaloric materials, such as the $Gd_5(Si_{1-x}Ge_x)_4$ family of compounds. It is envisioned that this composite architecture can be easily deployed in many materials, geometries and forms. The present invention can produce an effect that resembles amplification of an applied magnetic field and produces an increased or enhanced magnetocaloric effect.

Other objects, advantages and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Figure 2:
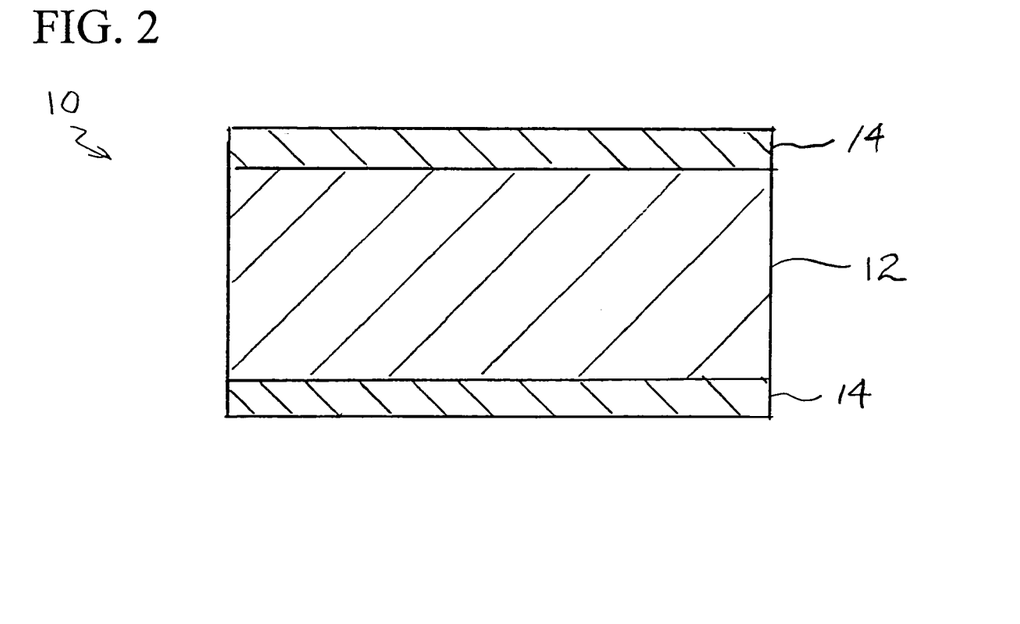
FIG. 2 is a cross-sectional view of an enhanced magnetocaloric effect material formed in accordance with the present invention.

In general, the present invention is a magnetostructural heterostructure with a magnetocaloric effect (MCE) having at least two different phase components. FIG. 2 shows a cross-section of an enhanced MCE heterostructure material 10 of the present invention in its simplest form. The enhanced MCE heterostructure 10 includes a first component consisting of a magnetostructural material core having a magnetocaloric effect 12, which has a magnetic transition temperature equal to or greater than 150 K. As mentioned above, a "giant magnetocaloric material" is a magnetic material that undergoes a coupled magnetic and structural change under the application of a magnetic field. The MCE core 12 of the present invention is preferably any giant magnetocaloric material having a magnetic transition temperature equal to or greater than 150 K. In a preferred embodiment, the giant magnetocaloric material is a $Gd_5(Si_{1-x}Ge_x)_4$ compound. The core 12 is coated on at least one surface with a second component consisting of a constricting material 14. A "constricting" material, as defined herein, is a medium- to high-strength material that can affect volume changes of the core 12 when a magnetic field is applied thereto. It is estimated that any material having a Modulus of Elasticity of more than about $0.1 \times 10^6$ psi will meet this criteria. However, preferable elastically stiff constricting materials will typically have a Modulus of Elasticity in the range of $10 \times 10^6$ psi-$40 \times 10^6$ psi and may include iron (Fe), cobalt (Co), copper (Cu), nickel (Ni), titanium (Ti), silicon (Si), aluminum (Al) and alloys and compounds, including oxides, thereof.

When $Gd_5Si_{1.5}Ge_{2.5}$ is used as the core 12 material, the magnetic field amplification coating 14 may be applied to slices of an arc-melted $Gd_5Si_{1.5}Ge_{2.5}$ core 12. In the embodiment shown in FIG. 2, the coating 14 is present as two conformal thin layers, having an approximate thickness of 100 nm (0.1 µm), coated on opposite sides of the Gd-based core 12, whereas the Gd-based core has an approximate thickness of 0.6 mm. Thus, in this manner, a magnetocaloric heterostructure is created.

As mentioned above, the Gd-based compound core alone exhibits a "giant" magnetocaloric effect around its magnetic ordering transition due to a first-order coupled magnetic-crystallographic transformation driven by the reversible destruction and reformation of specific covalent Si(Ge)—Si(Ge) bonds. The crystallographic transformation occurs via a martensitic-like collective shear movement of sub-nanometer thick building slabs. The family of $Gd_5(Si_{1-x}Ge_x)$ compounds is metamagnetic (i.e., the crystal structure transformation from the ferromagnetic orthorhombic $Gd_5Si_4$-type (Pnma) structure to paramagnetic monoclinic $Gd_5Si_2Ge_2$-type (P1121/a) structure can be easily induced by changes of temperature, magnetic field and pressure in the vicinity of the Curie temperature). While the metamagnetic character is reversible, it does have a temperature and field hysteresis consistent with the first-order thermodynamic nature of the phase change. $Gd_5Si_{1.5}Ge_{2.5}$ is a magnetically heterogeneous system in the region of its first-order phase transition temperature characterized by coexistence of a magnetically-ordered (ferromagnetic) and a disordered (paramagnetic) phase. This two-phase coexistence gives rise to a unique two-stage initial magnetization behavior, wherein the first stage corresponds to magnetization of the ferromagnetic phase via domain-wall movement and magnetization rotation processes, and the second stage signals a field-induced paramagnetic-to-ferromagnetic (metamagnetic) transition that occurs at a critical onset field $H_{onset}$.

It has been found that the application of a thin layer of a strain- or deformation-resistant (constricting) coating material 14 to both surfaces of a slice of $Gd_5Si_{1.5}Ge_{2.5}$ core 12 effectively lowers the magnitude of the applied magnetic field required to induce the magnetocaloric effect within the core without significantly altering the magnitude of the induced MCE effect. The two phases of the resulting heterostructure complement each other to provide a "kick" to the MCE effect.

Figure 3:
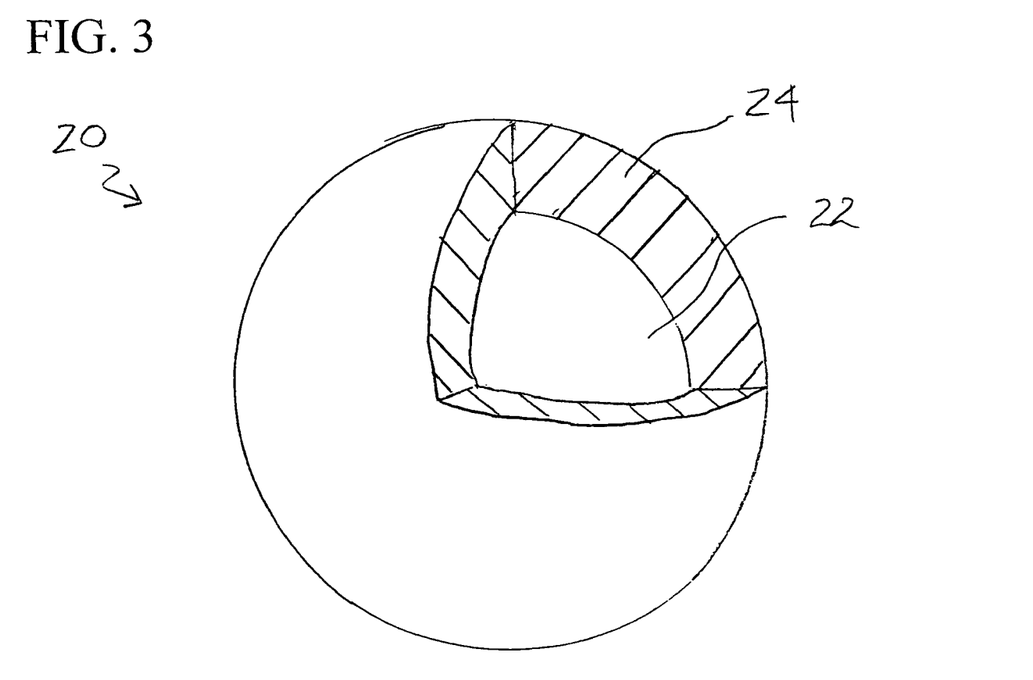
FIG. 3 is a cross-sectional view of the preferred embodiment of the enhanced magnetocaloric effect material of the present invention.

FIG. 3 shows the preferred embodiment of an MCE nanocomposite 20 formed in accordance with the present invention. In order to more fully explore and optimize the results of the enhanced magnetocaloric effect investigations in magnetic nanocomposites it is preferred to fully encapsulate individual spherical particles 22 of the giant magnetocaloric material, such as compounds of the $Gd_5(Si,Ge)_4$ family, with a coating 24 of a constricting material, as discussed above. The coating 24 is preferably conformal, homogeneous, uniform and of precise thickness. Soft magnetic materials may be particularly well-suited as coating materials. In a preferred embodiment, the core particles 22 can be a commercial-grade $Gd_5(Si,Ge)_4$ compound with nominal diameter of about 30 microns on which a variety of coating compositions 24 and thicknesses can be applied. For example, coatings of 50 nm, 100 nm and 200 nm with compositions of Fe, Ni/Fe, Fe/Co, Al and Si can be applied to produce different samples. Thus, an MCE heterostructure powder consisting of a plurality of heterostructure particles 20 can be produced that can be utilized in a variety of applications.

The magnetic composite powder can be made by coating the giant magnetostructural material (such as the GdSiGe compounds) particles 22 with a constricting coating 24 using chemical vapor deposition. A Fast-Fluidized Bed Chemical Vapor Deposition (FFBCVD) process is ideal to achieve these processing parameters and objectives. Generally, chemical vapor deposition (CVD) is a plating method that relies on the chemical reaction of a vapor at a surface to form solid structural deposits. Since this is done on an atom-by-atom basis, impurity levels are typically less than 0.1% and densities are 99.9%. The CVD process utilizes a gaseous compound of the element to be deposited, which is then flowed over a heated substrate, resulting in thermal decomposition or reduction of the gaseous compound and subsequent deposition of the material onto the substrate. The first layer forms at nucleation sites and, after the substrate is fully coated, growth continues on the deposit's crystal faces.

Successful CVD, producing dense, adherent coatings, depends upon experimentally determining optimal deposition parameters. These parameters include: the gaseous compound of the material to be deposited, substrate temperature, gas concentration, flow, pressure and geometry within the reaction chamber, coating thickness and substrate material. For the coating to have high integrity and adhesion to the substrate, the substrate either must have a similar coefficient of expansion to that of the deposited material or must form a strong chemical or metallurgical bond with it. The thinner the coating, the less similar the coefficients of expansion need be. Where coating and substrate form no intermetallic bond and have widely differing coefficients of expansion, a good bond often can be achieved by using a thin interlayer of a third material.

Fluidized beds, and more preferably fast-fluidized coating apparatus, are ideal tools for producing the fine powder materials of the present invention. Operating a fluidized bed above the transport limit (fast fluidization) or in the turbulent fluidization region may enable fine powders and whiskers, chopped fibers and such to be fluidized with high product yields. This technology eliminates problems with heat and mass transfer and handling fine and cohesive powders by using high gas shear velocities and turbulent gas mixing technologies. In a fast-fluidized bed, high gas velocities are used to entrain the small particles, which are then filtered out of the gas entrainment stream and re-fed to the bottom of the reactor.

While not wanting to be bound by theory, it is believed that, in both of the embodiments described above, both mechanical and magnetic mechanisms underlie the enhancement of the entropy change in giant magnetocaloric compounds such as the $Gd_5Si_{1.5}Ge_{2.5}$ compound of the example. In particular, it has been found that the application of a ferromagnetic and/or elastically-stiff (constricting) coating to the giant magnetocaloric material has the effect of mechanically restricting significant expansion and/or contraction volume changes that accompany the magnetic transition occurring upon application of a magnetic field, thereby effectively amplifying the magnetic field experienced by the magnetocaloric material, and thus resulting in favorably displacing the effect to different temperatures and fields. Although the restriction of volume changes may contribute to the enhancement the magnetocaloric effect in the heterostructure, we cannot presently reconcile this with the results showing the dependence of the enhancement on the thickness of the coating wherein thicker coatings were not as effective as very thin coatings. One possible explanation may be that chemical vapor deposition may be more "successful" (producing dense, adherent coatings) for thinner coatings than for the thicker coatings of the examples demonstrated herein.

It was considered but then rejected that the stray field of a soft magnetic (e.g., Fe) layer may serve to amplify the externally applied field. Measurements of the magnetostatic effect of the Fe coatings were carried out by comparing the room-temperature paramagnetic response obtained from the single-phase $Gd_5Si_{1.5}Ge_{2.5}$ and the heterostructured $Gd_5Si_{1.5}Ge_{2.5}$ specimens. No discernable difference in the response of the two specimens was detected, indicating that the magnetostatic contribution is extremely small and unlikely to produce the large changes noted in the ferromagnetic response. The enhanced field sensitivity found in the heterostructured samples is not due to a lowered energy barrier to reverse magnetic domain nucleation, because measured full field cycles indicate that the heterostructured samples display a stabilization of magnetization upon magnetic field reversal, not a reduction of the magnetization relative to the uncoated sample. Ferromagnetic exchange coupling between the Fe layer and the $Gd_5Si_{1.5}Ge_{2.5}$ is conceivable because of the very large value, approaching 50 nm, of the domain wall width in Fe despite the presence of a layer of Gd oxide that is undoubtedly intervening between the Fe and the $Gd_5Si_{1.5}Ge_{2.5}$ interfaces.

In addition to the above findings, the rejection of the theory that the stray field of the soft magnetic layer served to amplify the externally applied field is further supported by our recent results (Lewis, et al (2004) J. App. Phys 95: 6912–6915, the contents of which are incorporated herein by reference) that demonstrate that 100 nm coatings of non-ferromagnetic materials, e.g., Al, also served to amplify the externally applied field.

It is envisioned that this composite architecture can be easily deployed in many materials geometries and forms. Established technology exists to provide a thin metallic coatings onto layers and particles of many compositions. Very important advantages can be envisioned with the implementation of this development. In the case of the giant magnetocaloric materials such as the $Gd_5(Si_{1-x}Ge_x)_4$ family of compounds these results strongly suggest that it is possible to significantly lower the applied magnetic fields necessary to obtain a large heating or cooling effect.

EXAMPLE

A $Gd_5Si_{1.5}Ge_{2.5}$ sample core slice was prepared by conventional arc melting procedures using 99.9 percent Lunex rare earths and 99.999 percent silicon and germanium. The weight loss after melting was less than 1 percent and no subsequent heat treatment was carried out. Laboratory Cu—K$_\alpha$ x-ray diffraction studies revealed that the sample was well-crystallized and single-phase within the estimated limits of detection (5 vol %) and was isotropic, exhibiting no texture. Slices of Gd$_5$Si$_{1.5}$Ge$_{2.5}$ of approximate thickness 0.6 mm were cut with a water-cooled slow-speed wire saw and the surfaces were carefully polished with fine emery paper. Iron (Fe) layers of nominal thicknesses 0.1 μm or 0.2 μm were applied to both surfaces of the core slices by a chemical vapor deposition technique, with very small volume ratios of Fe: Gd$_5$Si$_{1.5}$Ge$_{2.5}$ of 0.03 vol % for the 0.1 μm layers and was 0.06 vol % for the 0.2 μm layers. During the Fe evaporation process the substrates were water-cooled and the chamber pressure was about 5×10$^{-6}$ Torr. The deposition rate was ~3–4 Å/sec as monitored by a quartz crystal oscillator. FIG. 2 provides a schematic illustration of the heterostructured sample architecture.

Magnetization measurements were made on both an uncoated Gd$_5$Si$_{1.5}$Ge$_{2.5}$ sample core and the coated heterostructure of Gd$_5$Si$_{1.5}$Ge$_{2.5}$+Fe in the temperature range 165 K to 235 K using a SQUID magnetometer. The uncoated Gd$_5$Si$_{1.5}$Ge$_{2.5}$ specimen was cut into a single prism with dimensions 0.5 mm×0.5 mm×6.0 mm, while the coated slices were cut into uniform coupons of dimensions 1.26 mm×1.26 mm×0.6 mm and stacked to mimic the prism shape. Care was taken to determine the appropriate demagnetization factors of the specimens as accurately as possible. To this end, the specimens were experimentally corrected for demagnetization effects by using the demagnetization factor measured from Fe slices of the same dimensions and geometry as the specimens. An inherent assumption in the application of this procedure is that the stacked heterostructure slices act as a monolithic magnetic solid.

In the case of the heterostructure with the 0.1 μm-thick Fe layer, ten slices were stacked together for measurement with the applied field perpendicular to the iron layer with a demagnetization factor N$_d$=0.083. With the field applied parallel to the iron layers two slices were stacked together that produced a demagnetization factor of N$_d$=0.2475. In the case of the heterostructure with 0.2 μm Fe layer, two slices were stacked together for measurement with the applied field both perpendicular and parallel to the iron layer, and the demagnetization factors are calibrated to be 0.319 and 0.2475, respectively. The demagnetization factor of the single Gd$_5$Si$_{1.5}$Ge$_{2.5}$ prism was determined to be N$_d$=0.022. The estimated error of the calculated entropy change ΔS, based on consideration of the uncertainties in the measured parameters, is on the order of 2% in the vicinity of the zero-field Curie temperature.

Figure 4:
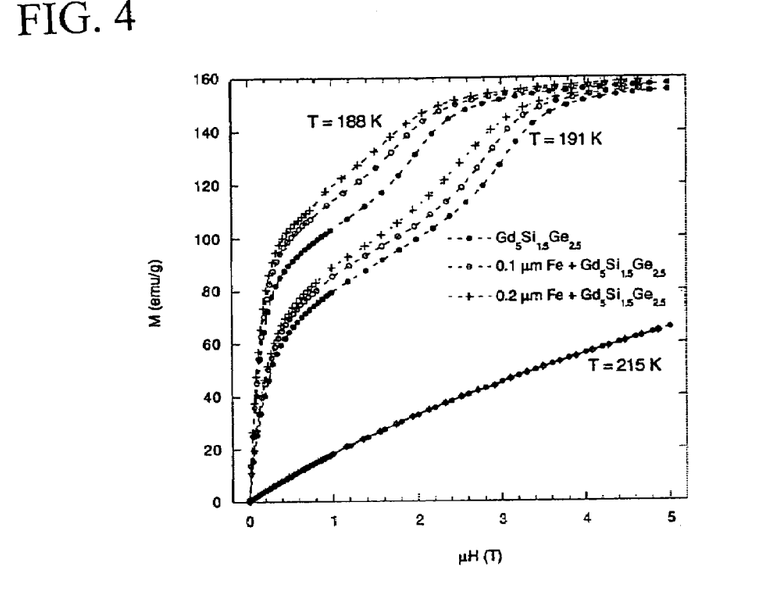
FIG. 4 is a graph showing selected magnetization curves at three representative temperatures for prepared samples of the enhanced magnetocaloric effect material of the present invention.

Magnetization curves and ΔS determinations were made for a total of five sample configurations: the single-phase Gd$_5$Si$_{1.5}$Ge$_{2.5}$ prism and the heterostructured samples of 0.1-μm and 0.2-μm Fe thicknesses measured with the applied field oriented both parallel and perpendicular to the Fe film plane. FIG. 4 shows selected magnetization curves at three representative temperatures: at T=188 K, below the zero-field Curie point; at the zero-field Curie point of 191 K and in the paramagnetic region at 215 K. For the sake of clarity only data for the parallel configuration is included in FIG. 4 (the data obtained from samples in the perpendicular configuration are similar). The expected two-stage magnetization development of the samples in the magnetically-ordered state is evident.

It is noted that the Fe layers have basically no effect at T=215 K when the Gd$_5$Si$_{1.5}$Ge$_{2.5}$ alloy is in the paramagnetic state. However, in the magnetically-ordered state, in both parallel and the perpendicular sample geometries, the heterostructured sample data exhibit two main features that are attributed to the Fe layers. The first feature is that the magnetization development, as quantified by the magnitude of the initial dc magnetic susceptibility χ$_{dc}$, initiates at significantly lower fields in the heterostructured samples. Thus domain wall movement and rotation of magnetization in the ferromagnetic component of the Gd$_5$Si$_{1.5}$Ge$_{2.5}$ sample is promoted by the iron layer.

Figure 5:
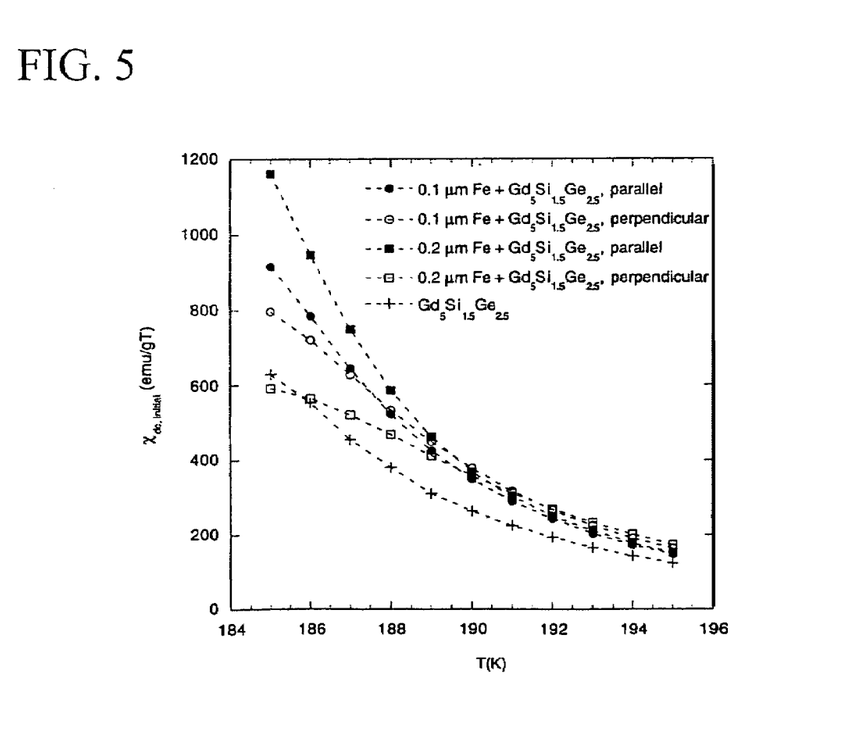
FIG. 5 is a graph showing the temperature dependence of the initial $\chi_{dc}$ of the samples shown in FIG. 4.

FIG. 5 displays the temperature dependence of the initial χ$_{dc}$ of the samples, where it can be seen that the Fe layers cause an increase of the initial susceptibility in the ferromagnetic component of the Gd$_5$Si$_{1.5}$Ge$_{2.5}$ alloy, effectively allowing it to be magnetized more readily. This susceptibility enhancement is especially evident at the lower temperatures and decreases monotonically with increasing temperature.

Figure 6:
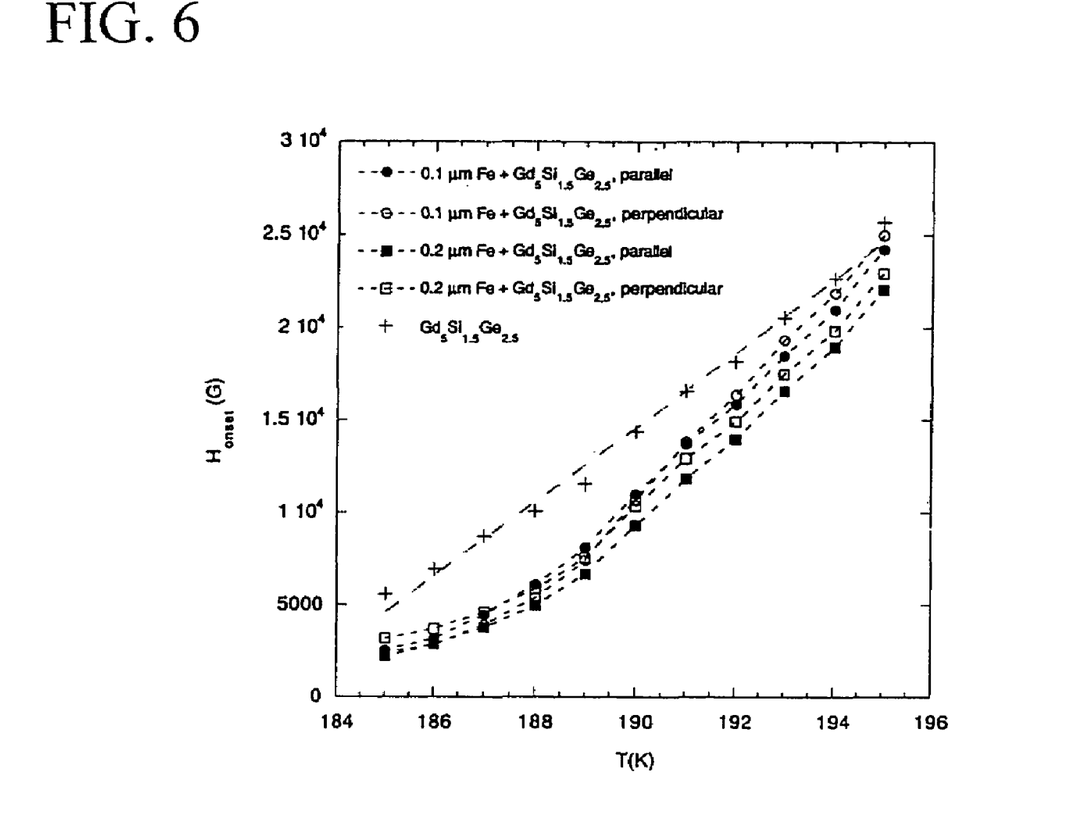
FIG. 6 is a graph showing the onset field differences $\Delta H_{onset}$ between the samples shown in FIG. 4.

The second feature originating from the presence of the Fe layers is that the field-induced paramagnetic to ferromagnetic phase transition shifts to lower onset fields H$_{onset}$. The paramagnetic-ferromagnetic onset field is determined as the minimum of the field derivative of the magnetization curve, dM/dH$_i$. The minimum in the curve signals the critical onset field at which the paramagnetic phase begins to change into the ferromagnetic phase, increasing the magnetic susceptibility in that field range. The onset field difference ΔH$_{onset}$ between the single-phase and the heterostructured Gd$_5$Si$_{1.5}$Ge$_{2.5}$ data reaches a maximum at approximately 4500 G at 187 K, then decreases with increasing temperature as shown in FIG. 6. The thicker Fe layer shifts the onset field to lower field values.

Figure 7:
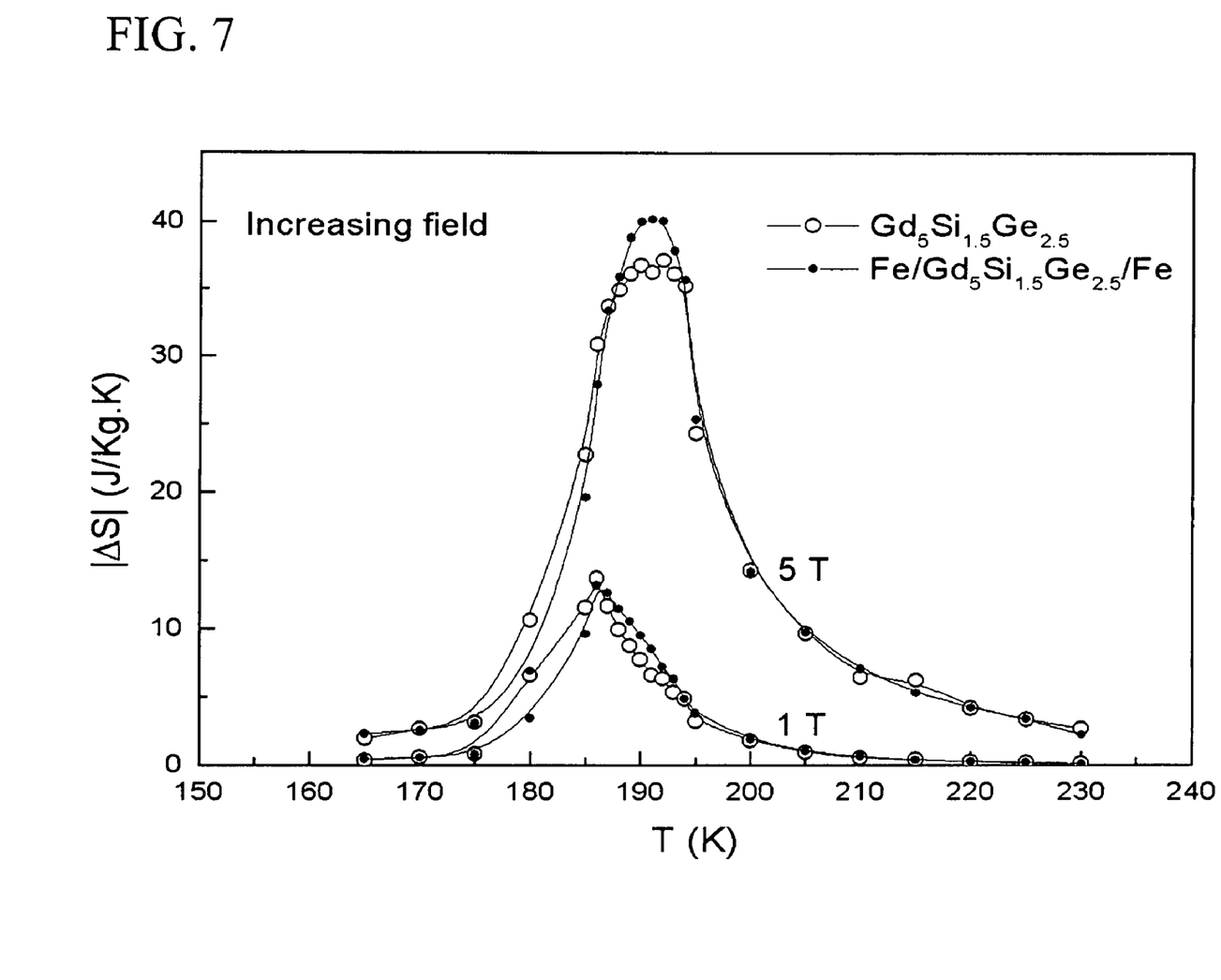
FIG. 7 is a graph showing the entropy changes determined for internal field changes of 1 T and 5 T for the samples shown in FIG. 4.

The increased field sensitivity of the magnetization processes and the metamagnetic transitions in the Gd$_5$Si$_{1.5}$Ge$_{2.5}$ compound conferred by the thin ferromagnetic coating results in an enhancement of the magnetocaloric effect. FIG. 7 displays the entropy changes determined for internal field changes of 1 T and 5 T. It can be seen in FIG. 7 that the selected heterostructured samples display a larger magnetic entropy change than the uncoated Gd$_5$Si$_{1.5}$Ge$_{2.5}$ in the vicinity of the metamagnetic transition temperature. For the sake of clarity of presentation, only the data from samples measured with the field parallel to the 0.1 μm-thick Fe layers are shown (the entropy changes for the same samples measured with the field perpendicular to the Fe layers fall between the uncoated Gd$_5$Si$_{1.5}$Ge$_{2.5}$ data and the Fe-coated parallel data).

The maximum effect is the 11% enhancement achieved at H$_{int}$=5 T with the field applied perpendicular to the 0.1 μm Fe layers. Although thicker iron layers shift the metamagnetic transition to lower field values, they do not contribute to an enhanced magnetocaloric effect. This result indicates that magnetocaloric effect enhancement is sensitive to the thickness of the Fe layer, and presents the possibility of obtaining an even more amplified MCE from optimized Fe layer thicknesses and/or optimization of the coating process.

Thus, it has been found that in the metamagnetic transition temperature range the Fe layer situated in a parallel geometry lowers the onset field of the metamagnetic transition by 4240 Oe for a 0.1 μm layer thickness and by 4940 Oe for a 0.2 μm layer thickness from the base value of 8700 Oe at 187 K in the absence of Fe layers. Furthermore, the 0.1 μm layer of Fe oriented perpendicular to the applied field is found to enhance the entropy change, and thus the magnetocaloric effect, by approximately 11% above its base value at 191.5 K.

These results conclusively demonstrate that very thin layers of Fe can produce an effect that resembles amplification of the applied magnetic field. The effects of Fe layers with thicknesses of 0.1 μm and 0.2 μm are demonstrated by an increased initial dc susceptibility $\chi_{dc}$ and a shift of the onset field $H_{onset}$ to lower fields to induce the paramagnetic-ferromagnetic metamagnetic transition in the $Gd_5Si_{1.5}Ge_{2.5}$ compound. Furthermore, the 0.1 μm coating produces an increased entropy change, indicative of an increased magnetocaloric effect, in the vicinity of the $Gd_5Si_{1.5}Ge_{2.5}$ Curie transition. All of these effects are observed when the applied field is oriented in geometries both parallel and perpendicular to the iron layers.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

The invention claimed is:

1. A magnetocaloric effect heterostructure comprising:
   a core layer of a magnetostructural material with a giant magnetocaloric effect having a magnetic transition temperature that is equal to or greater than 150 K; and
   a constricting coating layer coated on at least one surface of said core layer.

2. A magnetocaloric effect heterostructure as defined in claim 1, wherein said core layer of magnetostructural material is a compound of the $Gd_5(Si_{1-x}Ge_x)_4$ family.

3. A magnetocaloric effect heterostructure as defined in claim 2 wherein said core layer of giant magnetocaloric material is $Gd_5Si_{1.5}Ge_{2.5}$.

4. A magnetocaloric effect heterostructure as defined in claim 1, wherein said constricting layer is a low-coercivity, high-magnetization material.

5. A magnetocaloric effect heterostructure as defined in claim 4, wherein said coating layer of low-coercivity, high-magnetization material is selected from the group consisting of iron, cobalt, nickel and magnetic oxides.

6. A magnetocaloric effect heterostructure as defined in claim 1, wherein said coating layer of is a non-ferromagnetic material selected from the group consisting of Si, Al, Cu, Sn, their alloys and organic polymers.

7. A magnetocaloric effect heterostructure as defined in claim 1, wherein said constricting coating layer is coated on opposite surfaces of said core layer.

8. A magnetocaloric effect heterostructure as defined in claim 1, wherein said constricting coating layer substantially encapsulates said core layer.

9. A magnetocaloric effect heterostructure as defined in claim 1, wherein said coating layer is applied to said core layer using a chemical vapor deposition or an evaporative process.

10. A magnetocaloric effect heterostructure powder comprising a plurality of core particles of a magnetostructural material with a giant magnetocaloric effect having a magnetic transition temperature equal to or greater than 150 K, each of said core particles being encapsulated within a coating of constricting material.

11. A magnetocaloric effect heterostructure powder as defined in claim 10, wherein said magnetostructural material of said core particles is a compound of the $Gd_5(Si_{1-x}Ge_x)_4$ family.

12. A magnetocaloric effect heterostructure powder as defined in claim 11 wherein the magnetostructural material of the core particles is $Gd_5Si_{1.5}Ge_{2.5}$.

13. A magneto caloric effect hetero structure powder as defined in claim 10, wherein said constricting coating is a low-coercivity, high-magnetization material.

14. A magnetocaloric effect heterostructure powder as defined in claim 13, wherein said coating of low-coercivity, high-magnetization material is selected from the group consisting of iron, cobalt, nickel and magnetic oxides.

15. A magnetocaloric effect hetero structure powder as defined in claim 10, wherein said coating is a non-ferromagnetic material selected from the group consisting of Si, Al, Cu, Sn, their alloys and organic polymers.

16. A magnetocaloric effect heterostructure powder as defined in claim 10, wherein said core particles are substantially spherical.

17. A magnetocaloric effect heterostructure powder as defined in claim 6, wherein said core particles have a diameter of about 30 μm and said coating has a thickness between 50 nm and 200 nm.

18. A magnetocaloric effect heterostructure powder as defined in claim 10, wherein said coating is applied to said core particles using a chemical vapor deposition process.

19. A magnetocaloric effect hetero structure powder as defined in claim 10, wherein said coating is applied to said core particles using a thermal evaporation deposition process.

20. A method for enhancing the magnetocaloric effect within a giant magnetocaloric material comprising the step of coating a surface of said giant magnetocaloric material having a magnetic transition temperature equal to or greater than 150 K with a constricting material.

21. A method as defined in claim 20, wherein said giant magnetocaloric material is a compound of the $Gd_5(Si_{1-x}Ge_x)_4$ family.

22. A method as defined in claim 20, wherein said constricting material is a low-coercivity, high-magnetization material.

23. A method as defined in claim 22, wherein said constricting material of low-coercivity, high-magnetization material is selected from the group consisting of iron, cobalt, nickel, and magnetic oxides.

24. A method as defined in claim 20, wherein said constricting material is a non-ferromagnetic material selected from the group consisting of Si, Al, Cu, Sn, their alloys and organic polymers.

25. A method as defined in claim 20, wherein said giant magnetocaloric material is coated on opposite surfaces.

26. A method as defined in claim 20, wherein said giant magnetocaloric material is substantially encapsulated by said coating.

27. A method of enhancing the magnetocaloric effect within a giant magnetocaloric material comprising the step of restricting volume changes of said giant magnetocaloric material during application of a magnetic field thereto.

28. A method as defined in claim 27, wherein said volume changes of said giant magnetocaloric material is restricted by a coating of a constricting material.

29. A method as defined in claim 28, wherein said constricting material is a low-coercivity, high-magnetization material.

30. A method as defined in claim 29, wherein said low-coercivity, high-magnetization material is selected from the group consisting of iron, cobalt, nickel, and magnetic oxides.

31. A method as defined in claim 27, wherein said constricting material is a non-ferromagnetic material selected from the group consisting of Si, Al, Cu, Sn, their alloys and organic polymers.

32. A method as defined in claim 27, wherein said giant magnetocaloric material is a compound of the $Gd_5(Si_{1-x}Ge_x)_4$ family.

33. A method as defined in claim 32 wherein the giant magnetocaloric material is $Gd_5Si_{1.5}Ge_{2.5}$.

34. A magnetocaloric effect heterostructure comprising:
   a core layer of a magneto structural material comprising a compound of the $Gd_5(Si_{1-x}Ge_x)_4$ family having a magnetic transition temperature that is equal to or greater than 150 K; and
   a constricting coating layer coated on at least one surface of said core layer.

35. A magnetocaloric effect heterostructure powder comprising a plurality of core particles of a magneto structural material comprising a compound of the $Gd_5(Si_{1-x}Ge_x)_4$ family having a magnetic transition temperature equal to or greater than 150 K, each of said core particles being encapsulated within a coating of constricting material.

36. A method for enhancing the magnetocaloric effect within a giant magnetocaloric material comprising the step of coating a surface of said giant magnetocaloric material comprising a compound of the $Gd_5(Si_{1-x}Ge_x)_4$ family having a magnetic transition temperature equal to or greater than 150 K with a constricting material.

37. A method of enhancing the magnetocaloric effect within a giant magnetocaloric material comprising the steps of:
   providing a giant magnetocaloric material comprising a compound of the $Gd_5(Si_1Ge_x)_4$ family having a magnetic transition temperature equal to or greater than 150 K, and
   restricting volume changes of said giant magnetocaloric material during application of a magnetic field thereto.

* * * * *